United States Patent Office 3,442,019
Patented May 6, 1969

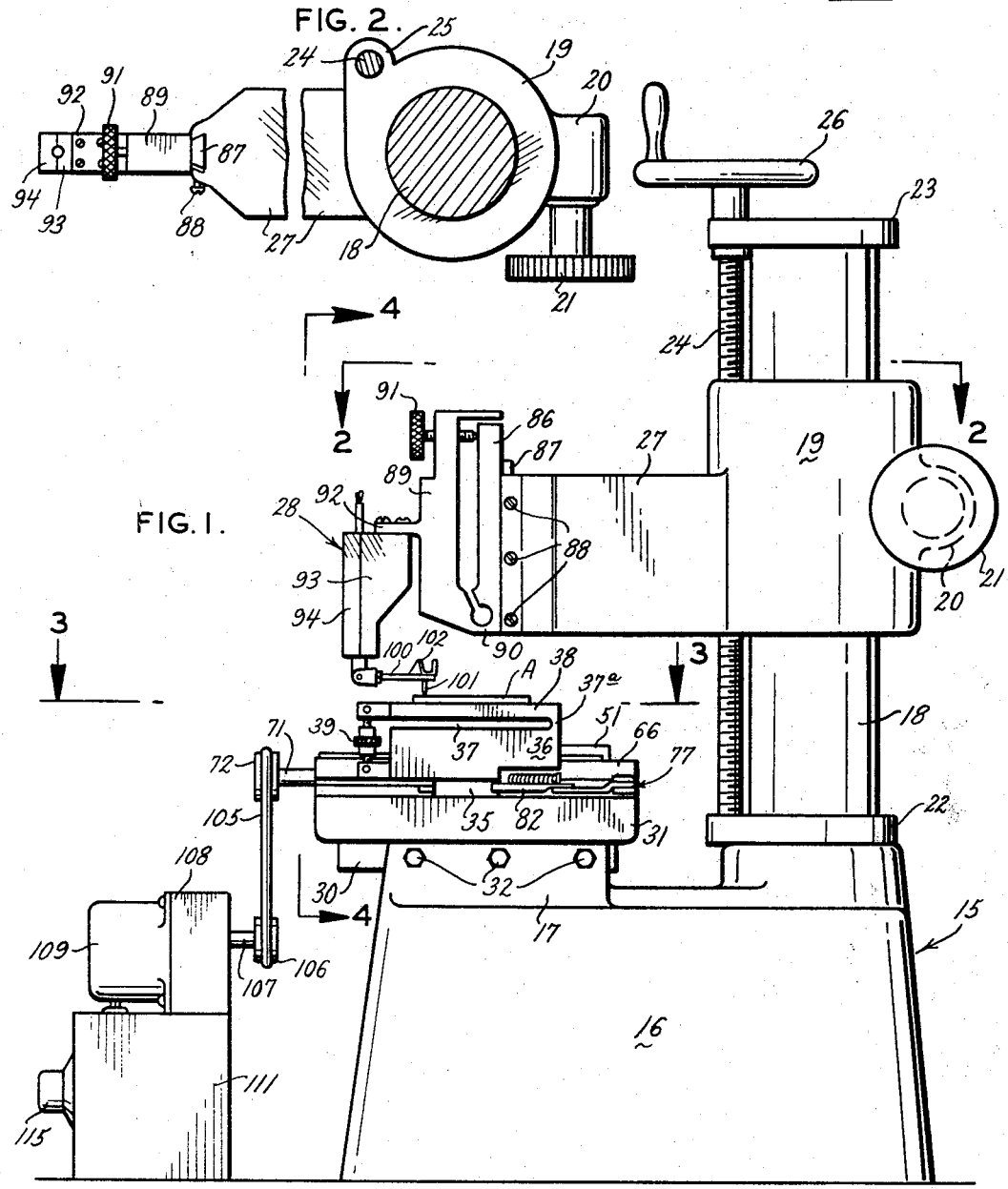

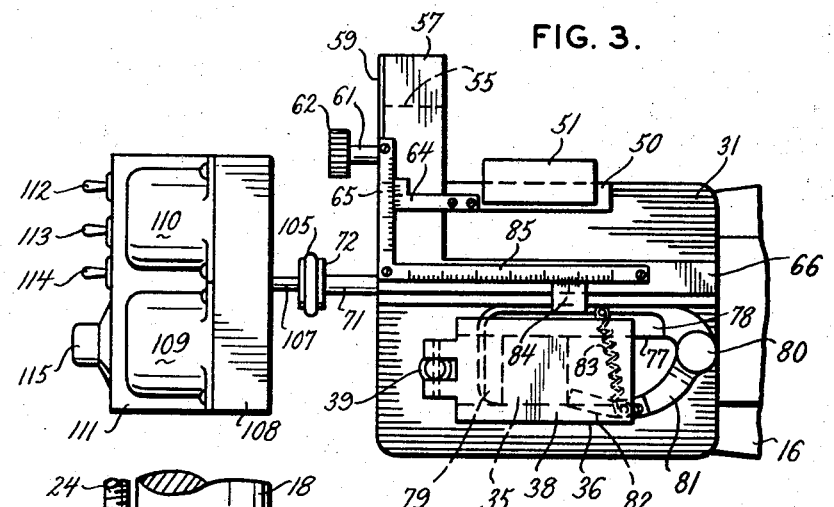
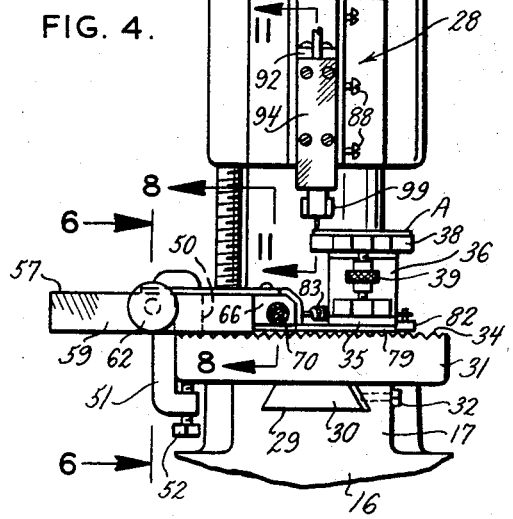
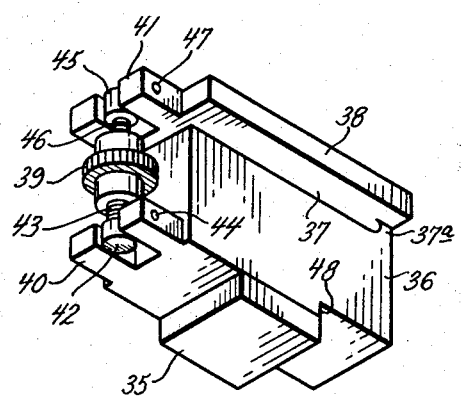
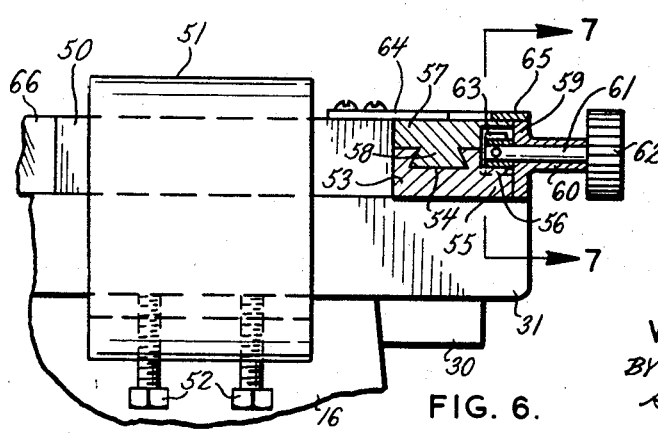
FIG. 3. FIG. 4. FIG. 5. FIG. 6. FIG. 7.
INVENTORS
GARY C. BREITWEISER
WILLIAM B. BURFORD III
ATTORNEYS

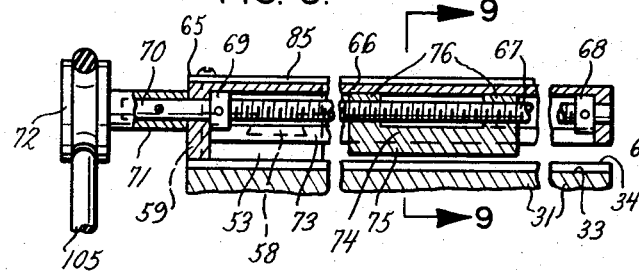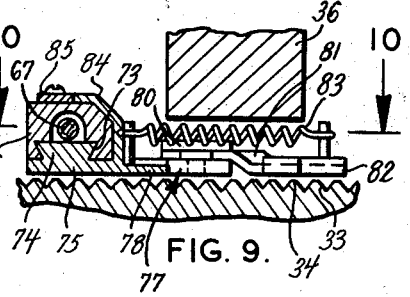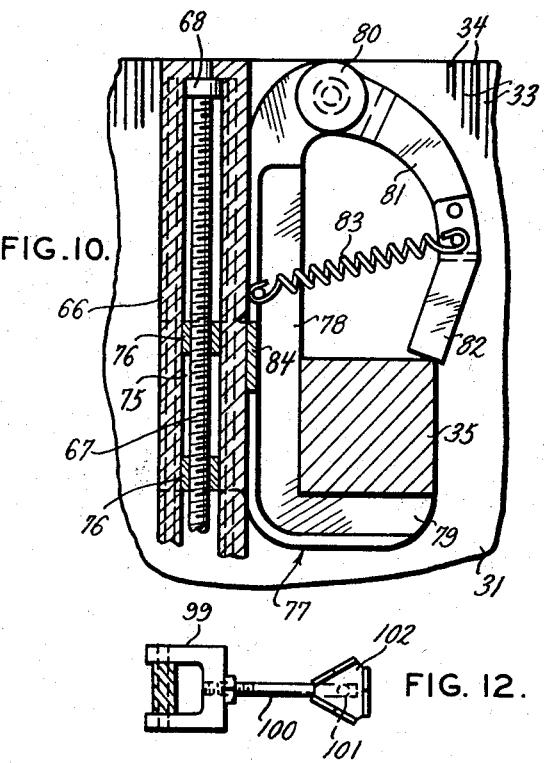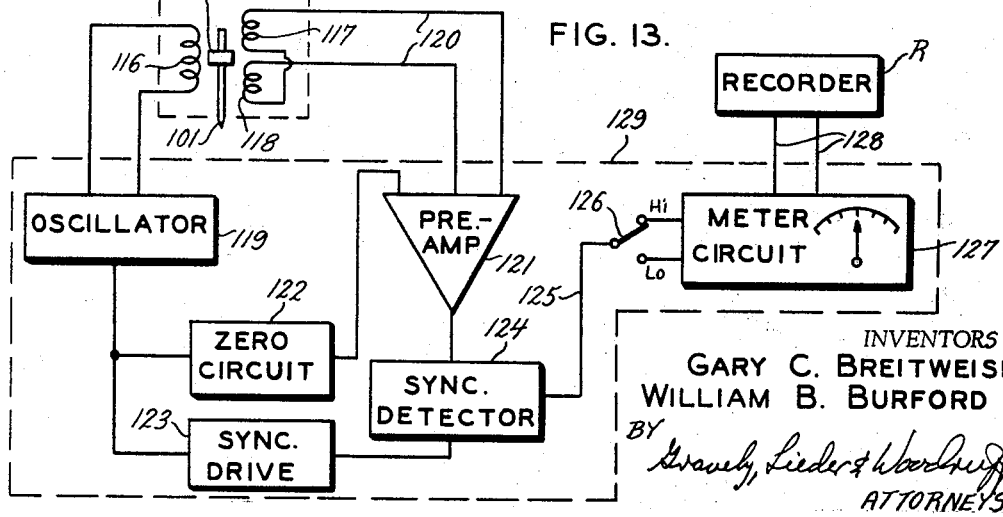

1

3,442,019
RECORDING TYPE PROFILE ANALYSING
APPARATUS
Gary C. Breitweiser, Alton, Ill., and William B. Burford III, Webster Groves, Mo., assignors, by mesne assignments, to McDonnell Douglas Corporation, St. Louis County, Mo., a corporation of Maryland
Filed Jan. 24, 1966, Ser. No. 522,454
Int. Cl. G01d 5/02
U.S. Cl. 33—174                                    7 Claims

ABSTRACT OF THE DISCLOSURE

Thickness analysing apparatus for thin films whereby the measuring stylus for determining thickness and profile shape of a thin film remains stationary and the holder for the film moves relative to the stylus over a reference surface which establishes a plane in which motion occurs. The thickness response of the stylus is picked up by a linear variable differential transformer in which the transformer core is actuated by the stylus from a null position and is proportional to the displacement of the stylus, and the profile response is obtained by amplifier and magnification means which evaluate the voltage phase and value of the transformer output.

This invention relates to improvements in profile analysing apparatus and is particularly concerned with apparatus for measuring and magnifying the measurement of the thickness and surface profile of thin films, and for obtaining extremely accurate measurements in areas of commercial and industrial activities other than that which is most concerned with measuring thin films.

In the past industry has been concerned mainly with quality control in the shaping and finishing operations of objects. Of these concerns, surface finish has been measured by a sensing stylus moving over a nominal surface line representing a compromise condition of the true roughness condition. However, the roughness figure obtained has been a measure of the deviation of the object from a smooth but not necessarily flat surface. In most roughness testing intsruments the sensing head is supported on skids which ride over the surface of the object, thereby providing no truly flat reference line. Such instruments are incapable of detecting long range irregularities such as waviness or curvature in the surface.

In the case of profile analysing means there is provided a precision reference flat which establishes an accurate base line for measurements, and the sensing head or probe moves over the surface to be investigated while recording movement with respect to the reference flat. Such apparatus can make long range measurements as the base line is independent of the characteristics of the surface under investigation. There are limitations in known profile analysing means, some in the restrictions on accuracy imposed by the mechanical components and some due to the manner of picking up the mechanical response and translating it into an electrical signal.

When it comes to measurement of thin films there is a need for accurate, rapid and simple apparatus capable of measuring films as thin as of the order of one ten-millionth of an inch with a precision of the order of one ten-millionth of an inch. Such means as interferometers, X-ray and optical transmission devices involve excessive time and very experienced operators to obtain good results.

It is an object of this invention to improve upon known apparatus and to significantly extend the range of thinness which can be measured as well as the accuracy of the measurement.

2

Another object of this invention is to provide a surface feeler unit that is highly sensitive and does not distort, damage or mar the object being investigated.

The present invention has as a further important object the provision of very simple profile analysing apparatus for measuring the surface profile of a thin film in a more rapid and positive manner than has been heretofore possible by available apparatus.

It is still another object of this invention to provide apparatus which has an extremely high magnification using ordinary devices in a unique arrangement not heretofore known.

Still another object of this invention is to provide apparatus which combines simple components with an extremely sensitive and accurate surface feeler unit, whereby the surface or other characteristic of the object may be magnified and recorded as fast as the unit senses the surface or other characteristic being investigated.

Other objects and advantages of this invention will be set forth in the description which follows directed to a presently preferred embodiment which comprises a stand for the object having a stylus unit and an anvil unit thereon, means to adjust the position of the object and the stylus unit, motor drive means and controls, and amplifier and recorder means for magnifying the response of the stylus unit. While the general character of the present apparatus is outlined above, it can be seen in more detail in the accompanying drawings, wherein:

FIG. 1 is a side elevational view of the apparatus which embodies the principles of the invention;

FIG. 2 is a fragmentary and partial sectional view taken at line 2—2 in FIG. 1;

FIG. 3 is a further fragmentary view taken at line 3—3 in FIG. 1;

FIG. 4 is a fragmentary front elevational view taken at line 4—4 in FIG. 1;

FIG. 5 is a perspective view of the object holder means forming a part of the apparatus of FIG. 1;

FIG. 6 is a fragmentary side view partly in section as seen at line 6—6 in FIG. 4;

FIG. 7 is a fragmentary sectional view taken at line 7—7 in FIG. 6;

FIG. 8 is a fragmentary sectional view taken at line 8—8 in FIG. 4;

FIG. 9 is a fragmentary sectional view taken at line 9—9 in FIG. 8;

FIGURE 10 is a fragmentary plan view at line 10—10 in FIG. 9;

FIG. 11 is a fragmentary side view at line 11—11 in FIG. 4;

FIG. 12 is a fragmentary view at line 12—12 in FIG. 11; and

FIG. 13 is a schematic wiring diagram of the recording and electrical components of the present apparatus.

Referring to FIG. 1 the apparatus is seen to comprise a gauging stand 15 having a substantially rigid base 16 surmounted by an integral support 17 at its front portion and a vertical column 18 rising above the base at its rear portion. The column 18 carries a head 19 slidable vertically and having a suitable locking device in the rear boss 20 from which the manipulating knob 21 projects. The column 18 is provided with a lower guide 22 and an upper guide 23 for the respective ends of a threaded feed shaft 24 which has driving engagement in a threaded boss 25 (FIG. 2) at one longitudinal side of head 19. The upper end of the shaft 24 is provided with a band wheel 26 for operating shaft 24 to run the head 19 vertically along column 18 when the locking device is released by knob 21. As will presently appear the head 19 supports a forwadrly projecting rigid arm 27 on which a stylus unit 28 is mounted.

The support 17 on the base 16 (FIG. 4) is formed with a dovetail groove 29 (FIG. 4) which receives a dovetail guide 30 on the underside of an anvil block 31. The anvil block 31 is adjustable in the groove 29 as desired and is secured by a plurality of set screws 32 (FIGS 1 and 4). As may be seen in FIGS. 3, 4, 7, 9 and 10, the upper face of the anvil block 31 is formed with a plurality of grooves 33 of V-shape having flattened apices 34 (FIG. 7). The grooves 33 are parallel with the dovetail guide 30 on the anvil block 31. The flattened apices 34 are lapped and polished flat to about 25 microinches over the entire face and prevent other flat surfaces, such as a gauging block 35 (FIG. 5), from "wringing down." The surfaces 34 constitute the reference flat of the anvil block 31 upon which the object holder slides, and may be chromium plated.

As can be seen in FIGS. 1, 3, 4, 5 and 9 the object holder 36 consists of a block (FIG. 5) of Invar steel to avoid temperature induced changes. The upper portion of the block 36 is formed with a slot 37 directed from an open front to an integral flexural pivot hinge web 37a at the rear edge, thereby providing a table portion 38 that may be angularly varied relative to the main base portion. The angular variations are effected by an adjustment nut 39 positioned between a projecting celvis 40 on the base portion and a clevis 41 on the table portion 38. The celvis 40 supports the head 42 of a threaded element 43 on a pivot pin 44, and celvis 41 supports the head 45 of a second threaded element on pivot pin 47. The elements 43 and 46 engage the nut 39, and these elements have threads of slightly different pitch but of the same hand so that there is developed a fine adjustment drive to change the angle of the upper flat surface on the table 38 relative to the reference surface on the anvil 31. The overall range of change of angle of the table surface is about ten minutes in the embodiment shown. The block 36 is rigidly affixed without distortion to the gauge block 35 which, in turn, rides on the reference surface formed by the groove flats 34. The rear underside of block 36 is notched at 48 (FIGS. 1 and 5) to receive a clamp presently to be noted.

A position controller means for locating the gauge block 35 and the block 36 mounted thereon is seen in plan view in FIG. 3, and the details thereof are seen in FIGS. 4 and 6 to 10. Such means includes an arm 50 fixed on the reference surface 34 of block 31 at one long side by a C-clamp 51 having the clamping screws 52 engaged on the underside of the block 31. The arm 50 is formed with a laterally angled portion 53 (FIG. 6) having a dovetail groove 54 in its upper face and at its front margin 55 a series of rack teeth 56 are formed (FIG. 7). The lateral arm portion 53 carries a slide 57 with a dovetail projection 58 riding in groove 54. The front margin of the slide 57 carries a closure member 59 for the rack teeth 56 and is formed with a bearing sleeve 60 to support a shaft 61. Knob 62 on shaft 61 rotates a rack pinion 63 which drives the slide 57 back and forth on the fixed rack 55 in a direction normal to fixed arm 50 and crosswise of the reference surface on block 31. A fixed scale 64 on arm 50 and a scale 65 on the slide 57 cooperate to show the amount of linear crosswise movement of the slide 57.

As is seen in FIGS. 3, 8, 9 and 10, the slide 57 has a right angular and rearwardly extending arm 66 spaced above the block 31. The arm is grooved on its underside to receive a threaded shaft 67 having its rearmost end carried in a pilot bearing 68 pinned to the arm to retain the shaft in fixed position but free to rotate only. The forward portion of shaft 67 is supported by a similar bearing 69 and a shaft projection 70 is connected to a sleeve 71 on a drive pulley 72. The groove on the underside of arm 66 (FIG. 9) is formed with a dovetail slot 73 to receive a cooperating dovetail projection 74 on a slide member 75 which has a pair of spaced arms 76 (FIG. 10) engaged on shaft 67. The slide member 75 extends out toward the gauge block 35 to support a carrier 77 for the angle arm 78 of the gauge block clamp. The forward end of the arm 78 is formed with a finger 79 at right angles to engage the gauge block, while the rearward end is formed with a pivot 80 for a clamp arm 81, the nose portion 82 of which engages a rear corner (FIGS. 3 and 10) of the block 35 and forces the block against finger 79. A spring 83 maintains a load on the nose 82 to retain the block 35 for movement with the slide member 75. Thus fore and aft movement of the object holder 36 is achieved upon rotation of pulley 72, and a scale 84 (FIG. 3) on the slide 75 cooperates with a fixed scale 85 on arm 66 to show the amount of fore and aft movement.

The stylus unit 28 is seen in FIGS. 1, 2, 4 and 11 and includes a fine adjustment member 86 vertically slidable on a dovetail guide 87 set in a dovetail groove in the vertical end face of the arm 27. Set screws 88 fix the adjustment as desired. The member 86 carries a pivotally movable member 89 thereon at the integral flexural hinge web 90 at the lower end. An adjustment screw 91 adjacent the upper end of the member 89 bears on member 86 to more or less pivot the member 89 back and forth in a vertical plane. The member 89 has a bracket 92 which supports a housing 93. Housing 93 is provided with removable cover 94 (FIG. 11) which encloses a stylus suspended from the housing 93 on a flat spring element 95. The stylus comprises a main arm 96 extending upwardly in the housing to support a core 97 for movement within a differential transformer 98. The outer end of the stylus carries a clevis 99 frictionally secured at substantially right angles to the main arm 96, and an extension element 100 is attached to the clevis 99 (FIGS. 11 and 12). A tip 101 is fixed to the element 100 to project toward the object supporting table 38 and a pan 102 is fixed above the tip 101 so that suitable weights can be placed therein. Since the tracking force of tip 101 must be very low to avoid damage to the object the spring 95 is preferably made with a thickness of from 0.003 to 0.0015 inch.

The use of a thin flexible leaf spring, such as spring 95, provides support for the entire stylus while eliminating lost motion, friction, and roughness noise which is inherent in sliding or rotating bearings. The spring constant can be reduced to an almost negligible level and as a result the stylus tracking force can be as little as 0.04 gram and will remain essentially constant over the range of vertical displacement or movement imposed on the stylus.

The tracking force is a function of the spring constant of the spring 95 and the static load on the element 100. The weight to be added to the pan 102 for a selected spring constant over a 0.006 inch range of tip movement of 15 mg./0.001 inch is about 0.1 gram. When adjusted for this range of motion damage to an object is negligible, and elastic deformation to the object is insignificant. In keeping with the low tip force it is possible to have the tip size in the range of 0.0001 to 0.0002 inch diameter.

As indicated above the position controller means seen in FIG. 3 has a manual adjustment knob 62 which effects movement of the object holder 36 in an X coordinate from side to side of the reference surface block 31, and it has a pulley 72 driving shaft 71 which effects movement of object holder 36 in a Y coordinate toward and away from the column 18. The pulley 72 is driven by belt 105 (FIGS. 1, 3 and 8) on drive pulley 106 carried by the output shaft 107 of a gear unit 108. The unit 108 is powered by motors 109 and 110 which are responsive to a selector control unit 111 by which either motor 109 or 110 may be used separately, or the motors may be employed together but rotating in opposing directions for obtaining a very low speed output at shaft 107. One of the motors is a 5 r.p.m. synchronous motor providing a scan rate of holder 36 of one centimeter per minute. The other motor is a variable speed reversible D.C.

motor providing up to 50 r.p.m. at shaft 107 for rapid positioning of holder 36. This is an important feature as the horizontal magnification in the Y coordinate is a function of the translation of the object holder and the speed of a recording chart in the recorder shown diagrammatically at R in FIG. 13. The control unit 111 is provided with an on-off switch 112 and motor selector switches 113 and 114. The dial 115 on unit 111 is provided to control the motor speed.

In FIG. 11 the stylus unit 28 is provided with a differential transformer 98 in which the core 97 is movable in response to the trace of the stylus point 101 over the surface of an object A mounted on the surface of table 38. The table 38 is given a coating of a pressure sensitive aerosol adhesive (Quick-Stick, Maker Products, Irvington-on-Hudson, N.J.) to render it "tacky" and prevent motion of the object A relative to the table. The adhesive does not cause deformation of the object, but effectively holds the object when lightly placed thereon.

Turning now to FIG. 13 it can be seen that the differential transformer 98 consists of a primary coil 116 energized by the oscillator 119 producing an AC signal in the kilocycle/second range, and two secondary coils 117 and 118 connected in series opposition so as to produce voltages opposite in phase. The net voltage output of the secondary coils is the differences between these two coils, and with the core 97 at the central position the output is zero. The differential voltage produced at transformer 98 by movement of the core 97 away from its center or null position is essentially linear with core position, and the linear voltage response is shifted 180° as the core 97 moves in opposite directions from null. The output voltage is conducted by wires 120 to the amplifier-detector system which includes a pre-amplifier 121 in the preamplifier-detector control unit 129. The preamplifier 121 is provided with zero adjustment means 122 and the preamplifier drives a synchronous detector means 124 with drive means 123 which provides a D.C. output at lead 125 connected through a high (HI) and low (LO) switch 126 to a transistorized battery-powered electronic gauge unit 127. The unit 127 has a low range of 0.006 full scale and a high range of 0.0006 inch full scale. Circuit 128 from unit 127 leads to the high impedance recorder unit R having inputs down to 1 mv. for full scale deflection on the strip chart. The pre-amplifier accomplishes both amplification and phase detection, utilizing the synchronous detector 124 to distinguish between positive and negative displacements. The resulting voltage from the detector 124 is supplied to the meter 127 and to a set of output jacks (not shown) for the strip chart recorder R. A voltage divider (not shown) is incorporated in the output circuit and provides for a tenfold reduction in the output signal, and therefore in magnification. Full scale on the amplifier meter 127 provides a signal of 100 mv. to the recorder R and corresponds to a displacement at the stylus point 101 of 0.0006 inch with the voltage divider out or 0.006 inch when using the divider.

The recorder R, if set for 100 mv. span, will show a full scale displacement corresponding to a stylus movement of 0.006 inch (using the voltage divider) for a magnification of 750×. Without the voltage divider the full scale response is obtained with a stylus point displacement of only 0.0006 inch, or a magnification of 7500×. When, therefore, the recorder span is reduced from 100 mv. to 1 mv. full scale, the magnification becomes 750,000×.

There will be hereinafter described the operation of the presently preferred apparatus when the object A consists of a thin film resistor strip on a glass substrate. The steps in the operation of the apparatus include checking the operating parts for dust, especially the surface of the anvil 34 on which the object holder 36 is placed. It is usually necessary to permit the object or specimen to reach a substantially stabilized temperature as the effect of temperature is quite noticeable at high magnification. The recorder R and the pre-amplifier 121 are switched on with the pre-amplifier set on LO and the recorder set for 100 mv. for full scale response. The recorder is also set for 12 inch per minute chart speed, and when the recorder R is in use it is best to switch off the meter 127 to avoid shunting effects.

The stylus point 101 is initially given a coarse vertical adjustment by the handwheel 26 feeding the slide head 19 in the proper direction so that the point 101 will just contact object A as evidenced by a deflection on the recorder R. The locating means 21 is activated to fix the position of the slide head 19, and further vertical adjustment may be made through the knob 91 on the means 86. This fine adjustment is used in conjunction with the electric zero control on the pre-amplifier 121. The usual zero control on the recorder R is not used because this condition results in operations beyond the linear range of the stylus. The horizontal position of the object holder 36 with relation to the stylus point 101 is next adjusted by using the manual control 62 on the position controller. This will effect adjustments of the object holder 36 in the X coordinate. The Y coordinate adjustment is made through the motors in unit 111. It is also essential that the table 38 should have its object supporting surface essentially level in order to avoid having the recorder R produce a trace which is not parallel with the chart edges. The table leveling adjustment is effected by the nut 39 and the differential threaded pitch on the screws 43 and 46. During the leveling process for table 38 it may be necessary to reset the height of the stylus unit 28 with the manual fine adjustment 91. A satisfactory trace is characterized by a profile record which remains entirely within the boundaries of the chart on the recorder R at the maximum vertical magnification required. Care must be exercised in making the adjustment because of the sensitivity when it is desired to operate the apparatus to produce 750,000× magnification. When the apparatus has been properly set, the recorder R will produce a strip chart which will accordingly follow the surface of the glass substrate and the trace of the stylus point 101 over the thin film resistor strip. The chart trace will follow the profile of the substrate and thin film strip, and it is usual, because of noise and some vibration through the stand 16, that the trace on the chart will have secondary joggles and waviness of a very fine order of displacement. After a chart has been produced by recorder R it will show the profile of the thin film in relation to the profile of the substrate on which the film is mounted. The thickness of the resistor strip is detremined by drawing a nominal surface line through the substrate surface trace and another line roughly parallel to it through the resistor surface trace. Film thickness is measured as the vertical distance (perpendicular to the chart axis) between the two surface lines.

In view of the foregoing description and details of a presently preferred apparatus it should be appreciated that there are marked advantages for having the stylus unit 28 retained in a stationary condition, with only the stylus point 101 moving in an essentially vertical direction, while having the object A move relative to the stylus point 101 by means of the motor drive unit 111 operating through the belt 105. The stylus will be free of noise and vibration and it is more desirable to accurately control the rate of feed of the object holder 36 under the action of the shaft 71 driving the carrier 77 which, in turn, effects fore and aft movement of the block 35 which supports the object holder block 36. When the stylus is moved relative to the object, it is subject to vibrational pick-up from the traversing mechanism which produces a loss of resolution in the profile of the object under study. On the other hand, a wide range of horizontal magnification is made possible with the present apparatus by being able to vary the speed of traverse of the object A by suitable control over the motors 109 and 110. It can also be appreciated that extreme accuracy of response of the stylus point 101 is obtained by the use of a linear variable differential transformer 98. One of the important features is the use of the flexible thin section leaf spring 95 for supporting the stylus arm 96.

Considerable advantage also results from the use of two flat surfaces with broad areas of mutual contact, moving relative to each other, to generate the reference line. By this arrangement the effect of irregularities in the surfaces tends to be greatly reduced. In other instruments, using a convex surface sliding over a flat to generate the reference line, the bearing surface is much reduced and the reference line is greatly affected by irregularities in the flat surface.

An important advantage in the presently preferred apparatus is the application of a battery-powered transisterized pre-amplifier-detector unit 129 which reduces electrical noise to a level where resolution of the object can be of the order of 15 Angstroms. Operation of the apparatus from a 115 v. AC power supply was not successful.

While the foregoing description and drawings are given in view of a presently preferred form of the apparatus, it should be understood that various changes may be made in one or more of the components and parts, and that it is the aim and object hereof to include changesss and alterations which are the equivalent of those herein described or which may hereafter be set forth in appended scribed or which may hereafter be set forth in the appended claims.

What is claimed is:

1. In profile measuring apparatus for thin film carried on a substrate: a stand providing a reference surface; a holder movably mounted on said reference surface; a table adjustably carried by said holder and presenting a surface on which the thin film carrying substrate is placed; a stylus unit operably carried on said stand for initial adjustable movement toward and away from said table surface, said stylus unit including a frame, a flexible element on said frame having a free end, an elongated arm carried between its ends by said free end of said element, a stylus element mounted adjacent one end of said arm, a core element carried adjacent the other end of said arm, a linearly variable differential transformer on said frame surrounding said core element, and means connected to said stylus unit to initially adjust the engagement of said stylus element on the thin film substrate; means moving said holder over said reference surface to displace the substrate relative to said stylus element and cause the thin film to move relative to said stylus element, and said core element responding to stylus movement and moving in said transformer to generate a voltage substantially linear with core position; and amplifier detector means connected to said transformer to respond to the transformer voltage in terms of thickness of the thin film on the substrate.

2. The profile measuring apparatus of claim 1 in which said reference surface is a series of apices and grooves in said stand, said apices and grooves preventing said holder from wringing down on said reference surface.

3. The profile measuring apparatus of claim 1 in which means is operably connected to said holder and table to effect adjustment thereof, said means including threaded elements connected, one to said holder and one to said table, and rotatable means threadedly engaged with said threaded elements, said elements having differing thread pitch of the same hand.

4. The profile measuring apparatus of claim 1 in which said flexible element is a substantially thin section leaf spring furnishing the sole support for said elongated arm having a spring constant providing a stylus tracking force of the order of 0.04 gram.

5. The profile measuring apparatus of claim 4 in which means is connected to said elongated arm to receive weight to be added to the stylus to increase the stylus tracking force.

6. The profile measuring apparatus of claim 1 in which power means is operably connected to said holder to move the holder over said reference surface in a predetermined direction with respect to said stylus, said power means including a low speed synchronous motor and a variable speed reversible direct current motor, said motors being selectively operable independently and together with rotation in opposite directions.

7. The profile measuring apparatus of claim 1 in which pressure sensitive adhesive is placed on said table to retain the substrate in position for measuring the thin film.

References Cited
UNITED STATES PATENTS

| | | |
|---|---|---|
| 2,397,300 | 3/1946 | Tilton. |
| 2,672,716 | 3/1954 | Mentley et al. |
| 2,723,461 | 11/1955 | Reason et al. |
| 2,876,551 | 3/1959 | Bowlby. |
| 3,149,421 | 9/1964 | O'Brien. |
| 3,245,148 | 4/1966 | Whitney. |
| 3,250,012 | 5/1966 | Hilton et al. |

SAMUEL S. MATTHEWS, *Primary Examiner.*